(12) United States Patent
Sakamoto et al.

(10) Patent No.: US 7,736,795 B2
(45) Date of Patent: Jun. 15, 2010

(54) BATTERY AND METHOD OF MANUFACTURING THE SAME

(75) Inventors: Hiroyuki Sakamoto, Aichi-ken (JP); Tetsushi Kajikawa, Aichi-ken (JP); Shinichiro Ito, Shizuoka-ken (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 621 days.

(21) Appl. No.: 11/704,229

(22) Filed: Feb. 9, 2007

(65) Prior Publication Data

US 2007/0212601 A1 Sep. 13, 2007

(30) Foreign Application Priority Data

Mar. 7, 2006 (JP) .............................. 2006-060717

(51) Int. Cl.
*H01M 4/70* (2006.01)
(52) U.S. Cl. ....................... 429/128; 429/245; 29/623.1
(58) Field of Classification Search ................... 429/94, 429/128, 209, 245; 29/623.1
See application file for complete search history.

(56) References Cited

U.S. PATENT DOCUMENTS 5,958,088 A * 9/1999 Vu et al. .................... 29/623.1
6,020,086 A * 2/2000 Van Lerberghe ............ 429/163
6,610,445 B1 8/2003 Moriwaki et al.
2003/0017390 A1* 1/2003 Probst et al. ................ 429/176
2003/0039883 A1 2/2003 Notten et al.

FOREIGN PATENT DOCUMENTS

| EP | 0 949 028 A1 | 10/1999 |
| EP | 1 061 596 A2 | 12/2000 |
| JP | A 04-253154 | 9/1992 |
| JP | A 2001-093505 | 4/2001 |
| JP | A 2001-313066 | 11/2001 |
| JP | A 2002-0260719 | 9/2002 |

* cited by examiner

*Primary Examiner*—Stephen J. Kalafut
(74) *Attorney, Agent, or Firm*—Oliff & Berridge, PLC

(57) ABSTRACT

The present invention provides a battery prevented from causing a short circuit between a positive and negative electrode plates and a method of manufacturing the battery. This battery comprises an electrode plate assembly having a plurality of positive electrode plates and a plurality of negative electrode plates which are alternately laminated with separators interposed one by one between them. Each of the positive electrode plates and the negative electrode plates is configured to be curved to the same side in a lamination direction.

6 Claims, 12 Drawing Sheets

BATTERY AND METHOD OF MANUFACTURING THE SAME

BACKGROUND OF THE INVENTION

1. Field of the Invention

The present invention relates to a battery and a method of manufacturing the same.

2. Description of Related Art

Various types of batteries have been developed in recent years. For example, a nickel-metal hydride storage battery has rapidly come into wide use as a secondary battery with a high energy density and a high reliability.

This nickel-metal hydride storage battery has been known as e.g. a rectangular sealed nickel-metal hydride storage battery comprising an electrode plate assembly that includes a plurality of positive electrode plates and a plurality of negative electrode plates alternately laminated with separators interposed one by one between them, and a rectangular parallelepiped battery case containing the electrode plate assembly (e.g., JP-A-2001-313066, JP-A-2001-93505, and JP-A-2002-260719).

In the above nickel-metal hydride storage battery, the positive electrode plate includes for example a positive electrode plate produced in a manner that a positive electrode substrate made of foamed nickel (made by plating nickel on a skeleton surface of an urethane foam and then burning the urethane foam) is filled with a positive mix material containing a positive active material and so on. Further, the negative electrode plate includes for example a negative electrode plate produced in a manner that a negative mix material containing a hydrogen absorbing alloy and so on is filled in pores of a negative electrode substrate made of a nickel-plated steel plate and also coated on both surfaces of the negative electrode substrate. The electrode plate assembly includes for example an electrode plate assembly produced in a manner that a plurality of the positive electrode plates and a plurality of the negative electrode plates are alternately laminated with separators interposed one by one between them.

Meanwhile, the aforementioned positive electrode plates and negative electrode plates would not easily be formed in flat shape, which may be curved or warped. Thus, the positive and negative electrode plates constituting the electrode plate assembly include curved plates and uncurved plates, which are laminated with respective curves facing to opposite sides, resulting in an uneven distance between adjacent positive and negative electrodes. For instance, when such positive and negative electrodes expand or swell after repeated charge and discharge, each separator interposed therebetween may be compressed and, in particular, locally highly pressurized in a region where the opposite curves of the adjacent positive and negative electrode plates face to each other. In the region in which the separator is locally strongly compressed, the distance between the adjacent positive and negative electrode plates is short. This may deteriorate an insulation property of the separator between the positive and negative electrode plates, thus inducing a short circuit.

BRIEF SUMMARY OF THE INVENTION

The present invention has been made in view of the above circumstances and has an object to provide a battery prevented from causing a short circuit between a positive and negative electrode plates and a method of manufacturing the battery.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a battery comprising an electrode plate assembly having a plurality of positive electrode plates and a plurality of negative electrode plates which are alternately laminated with separators interposed one by one between them in a lamination direction, wherein each of the positive electrode plates and the negative electrode plates is curved to the same side in the lamination direction.

In the battery of the present invention, each positive electrode plate and each negative electrode plate are curved to the same side in the lamination direction. For instance, even when the positive electrode plates and the negative electrode plates expand or swell after repeated charge and discharge, compressing the associated separators interposed therebetween, it is possible to prevent the separators from locally becoming so highly pressurized as to shorten a distance between the positive and negative electrode plates. Thus, the electrode plate assembly can entirely ensure a sufficient insulation property between the positive and negative electrode plates. The battery of the present invention can therefore be achieved as a battery prevented from inducing a short circuit between the positive and negative electrode plates.

According to another aspect, the invention provides a battery comprising an electrode plate assembly having: a plurality of positive electrode plates each of which includes: a positive electrode substrate made of nickel and including a nickel skeleton of a three-dimensional network structure having a void part formed of a number of pores three-dimensionally connected, the positive electrode substrate having a front surface and a back surface, and a positive mix material filled in the void part of the positive electrode substrate; a plurality of negative electrode plates each of which includes: a negative electrode substrate made of metal having a front surface and a back surface, a front-surface-side negative mix material layer provided on the negative-electrode-substrate front surface and a back-surface-side negative mix material layer provided on the negative-electrode-substrate back surface, both layers being made of a negative mix material; and a plurality of separators; the positive electrode plates and the negative electrode plates being alternately laminated with the separators interposed one by one between them, wherein each the positive electrode substrates is configured to satisfy a relation of A<B, where "A" is an average thickness of a front-surface-side nickel layer forming the nickel skeleton constituting a front-surface-side nickel portion and "B" is an average thickness of a back-surface-side nickel layer forming the nickel skeleton constituting a back-surface-side nickel portion, assuming that the positive electrode substrate is divided into five regions in a thickness direction, a region closest to the positive-electrode-substrate front surface is the front-surface-side nickel portion and a region closest to the positive-electrode-substrate back surface is the back-surface-side nickel portion, and each of the negative electrode plates is configured to satisfy a relation of D<E, where "D" is a thickness of the front-surface-side negative mix material layer and "E" is a thickness of the back-surface-side negative mix material layer, and the positive electrode plates and the negative electrode plates are laminated so that all the positive-electrode-substrate front surfaces and the negative-electrode-substrate front surfaces face to the same side in the lamination direction.

The battery of the present invention comprises the electrode plate assembly arranged such that the positive and negative electrode plates are alternately laminated with the separators interposed one by one between them.

The positive electrode substrate constituting the positive electrode plate is configured to satisfy the relation of A<B between the average thickness A of the front-surface-side nickel layer and the average thickness B of the back-surface-side nickel layer. Such positive electrode substrate is curved to be concave on the front surface side and convex on the back surface side. Accordingly, the positive electrode plates having this positive electrode substrate is curved to be concave on the front surface side and convex on the back surface of the positive electrode substrate. On the other hand, the negative electrode plate is configured to satisfy the relation of D<E between the thickness D of the front-surface-side negative mix material layer and the thickness E of the back-surface-side negative mix material layer. Such negative electrode plate is curved to be concave on the front surface side and convex on the back surface side of the negative electrode substrate.

Meanwhile, the positive electrode plates and the negative electrode plates are laminated so that the positive-electrode-substrate front surfaces and the negative-electrode-substrate front surfaces face to the same side in the lamination direction. In the electrode plate assembly contained in the battery of the present invention, accordingly, all the positive electrode plates and the negative electrode plates are curved and, particularly, curved to the same side in the lamination direction. This configuration can prevent the separators from becoming locally strongly pressurized even when the separators are compressed by the positive and negative electrode plates interposing the separators interposed therebetween, thus preventing the distance between the positive and negative electrode plates from shortening. The electrode plate assembly can therefore entirely have a sufficient insulation property between the positive and negative electrode plates. The battery of the present invention can be achieved as a battery prevented from causing a short circuit between the positive and negative electrode plates.

According to another aspect, the invention provides a method of manufacturing a battery comprising an electrode plate assembly having a plurality of positive electrode plates each of which includes a positive electrode substrate having a front surface and a back surface, a plurality of negative electrode plates each of which includes a negative electrode substrate having a front surface and a back surface, and a plurality of separators, the positive electrode plates and the negative electrode plates being alternately laminated with the separators interposed one by one between them, wherein the method comprising a step of producing the electrode plate assembly, including alternately laminating the positive electrode plates each having a curved shape which is concave on the positive-electrode-substrate front surface side and convex on the positive-electrode-substrate back surface side and the negative electrode plates each having a curved shape which is concave on the negative-electrode-substrate front surface side and convex on the negative-electrode-substrate back surface side while interposing the separators one by one between the positive and negative electrode plates so that each positive-electrode-substrate front surface and each negative-electrode-substrate front surface face to the same side in the lamination direction.

According to the manufacturing method of the present invention, in the electrode plate assembly producing step, the positive electrode plates each having a curved shape which is concave on the positive-electrode-substrate front surface side and convex on the positive-electrode-substrate back surface side and the negative electrode plates each having a curved shape which is concave on the negative-electrode-substrate front surface side and convex on the negative-electrode-substrate back surface side are alternately laminated with the separators interposed one by one between the positive and negative electrode plates so that each positive-electrode-substrate front surface and each negative-electrode-substrate front surface face to the same direction in the lamination direction. Accordingly, the positive electrode plates and the negative electrode plates can be laminated with respective same curves facing to the same side in the lamination direction.

This configuration can prevent the separators from becoming locally strongly pressurized even when the separators are compressed by the positive and negative electrode plates interposing the separators interposed therebetween, thus preventing the distance between the positive and negative electrode plates from becoming shortened. The electrode plate assembly can therefore entirely have a sufficient insulation property between the positive and negative electrode plates. According to the manufacturing method of the present invention, the battery prevented from causing a short circuit between the positive and negative electrode plates can be manufactured.

According to another aspect, further, the invention provides a method of manufacturing a battery comprising an electrode plate assembly having: a plurality of positive electrode plates each of which includes: a positive electrode substrate made of nickel and including a nickel skeleton of a three-dimensional network structure having a void part formed of a number of pores three-dimensionally connected, the positive electrode substrate having a front surface and a back surface, and a positive mix material filled in the void part of the positive electrode substrate; a plurality of negative electrode plates each of which includes: a negative electrode substrate made of metal having a front surface and a back surface, a front-surface-side negative mix material layer provided on the negative-electrode-substrate front surface and a back-surface-side negative mix material layer provided on the negative-electrode-substrate back surface, both layers being made of a negative mix material; and a plurality of separators; the positive electrode plates and the negative electrode plates being alternately laminated with the separators interposed one by one between them, wherein the method comprises a step of producing the electrode plate assembly comprising alternately laminating the positive electrode plates each configured to satisfy a relation of A<B, where "A" is an average thickness of a front-surface-side nickel layer forming the nickel skeleton constituting a front-surface-side nickel portion and "B" is an average thickness of a back-surface-side nickel layer forming the nickel skeleton constituting a back-surface-side nickel portion, assuming that the positive electrode substrate is divided into five regions in a thickness direction, a region closest to the positive-electrode-substrate front surface is the front-surface-side nickel portion and a region closest to the positive-electrode-substrate back surface is the back-surface-side nickel portion, and the negative electrode plates each configured to satisfy a relation of D<E, where "D" is a thickness of the front-surface-side negative mix material layer and "E" is a thickness of the back-surface-side negative mix material layer, while interposing the separators one by one between the positive and negative electrode plates, so that all the positive-electrode-substrate front surfaces and the negative-electrode-substrate front surfaces face to the same side in the lamination direction.

In the manufacturing method of the present invention, used is the positive electrode plate configured to satisfy the relation of A<B between the average thickness A of the front-surface-side nickel layer and the average thickness B of the back-surface-side nickel layer. Such positive electrode plate is of a curved shape which is concave on the positive-electrode-substrate front surface side and convex on the positive-electrode-substrate back surface side. Further, used is the negative electrode plate configured to satisfy the relation of D<E between the thickness D of the front-surface-side negative mix material layer and the thickness E of the back-surface-side negative mix material layer. Such negative electrode plate is of a curved shape which is concave on the negative-electrode-substrate front surface side and convex on the negative-electrode-substrate back surface side.

In the electrode plate assembly producing step, the positive electrode plates and the negative electrode plates configured as above are alternately laminated with the separators interposed between them so that the positive-electrode-substrate front surfaces and the negative-electrode-substrate front surfaces face to the same side in the lamination direction. Thus, all the positive electrode plates and the negative electrode plates can be laminated with respective same curves facing to the same side in the lamination direction. This configuration can prevent the separators from becoming locally strongly pressurized even when the separators are compressed by the positive and negative electrode plates interposing the separators therebetween, thus preventing the distance between the positive and negative electrode plates from becoming shortened. The electrode plate assembly can therefore entirely have a sufficient insulation property between the positive and negative electrode plates. According to the manufacturing method of the present invention, the battery prevented from causing a short circuit between the positive and negative electrode plates can be manufactured.

Further, the negative electrode plate includes a negative electrode substrate made of metal and having a front surface and a back surface, a front-surface-side negative mix material layer provided on the front surface of the negative electrode substrate, and a back-surface-side negative mix material layer provided on the back surface of the negative electrode substrate, both layers being made of a negative mix material. This negative electrode plate is preferably configured to satisfy the relation of D<E between the thickness D of the front-surface-side negative mix material layer and the thickness E of the back-surface-side negative mix material layer.

Such negative electrode plate is of a curved shape with a concave front surface and a convex back surface. Using this negative electrode plate, as mentioned above, it is possible to achieve the battery prevented from causing a short circuit between the positive and negative electrode plates.

Further, the negative electrode plate of the present invention is preferably manufactured according to the following method.

The method of manufacturing the negative electrode plate including a negative electrode substrate made of metal, comprises the steps of: coating a negative paste containing a hydrogen absorbing alloy to both a front surface and a back surface of the negative electrode substrate, drying and hardening the negative paste coated on the negative electrode substrate to form a negative mix material layer, comprising drying and hardening a front-surface-side negative paste layer coated on the front surface of the negative electrode substrate to form a front-surface-side negative mix material layer and drying and hardening a back-surface-side negative paste layer coated on the back surface of the negative electrode substrate to form a back-surface-side negative mix material layer; pressing the negative electrode substrate formed with the front-surface-side negative mix material layer and the back-surface-side negative mix material layer so that the negative electrode substrate is compressed in a direction of thickness thereof; and cutting the compressed negative electrode substrate formed with the front-surface-side negative mix material layer and the back-surface-side negative mix material layer into a predetermined size; wherein the coating step comprises controlling thickness of the front-surface-side negative paste layer and thickness of the back-surface-side negative paste to satisfy a relation of D<E between thickness D of the front-surface-side negative mix material layer and thickness E of the back-surface-side negative mix material layer.

According to this method of manufacturing the negative electrode plate, in the coating step, the thickness of the front-surface-side negative paste layer and the thickness of the back-surface-side negative paste layer are controlled to satisfy the relation of D<E between the thickness D of the front-surface-side negative mix material layer and the thickness E of the back-surface-side negative mix material layer. Accordingly, following the subsequent steps of drying, pressing, and cutting, the negative electrode plate configured to satisfy the relation of D<E between the thickness D of the front-surface-side negative mix material layer and the thickness E of the back-surface-side negative mix material layer can be produced. This negative electrode plate can be of a curved shape which is concave on the front surface side and convex on the back surface side.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
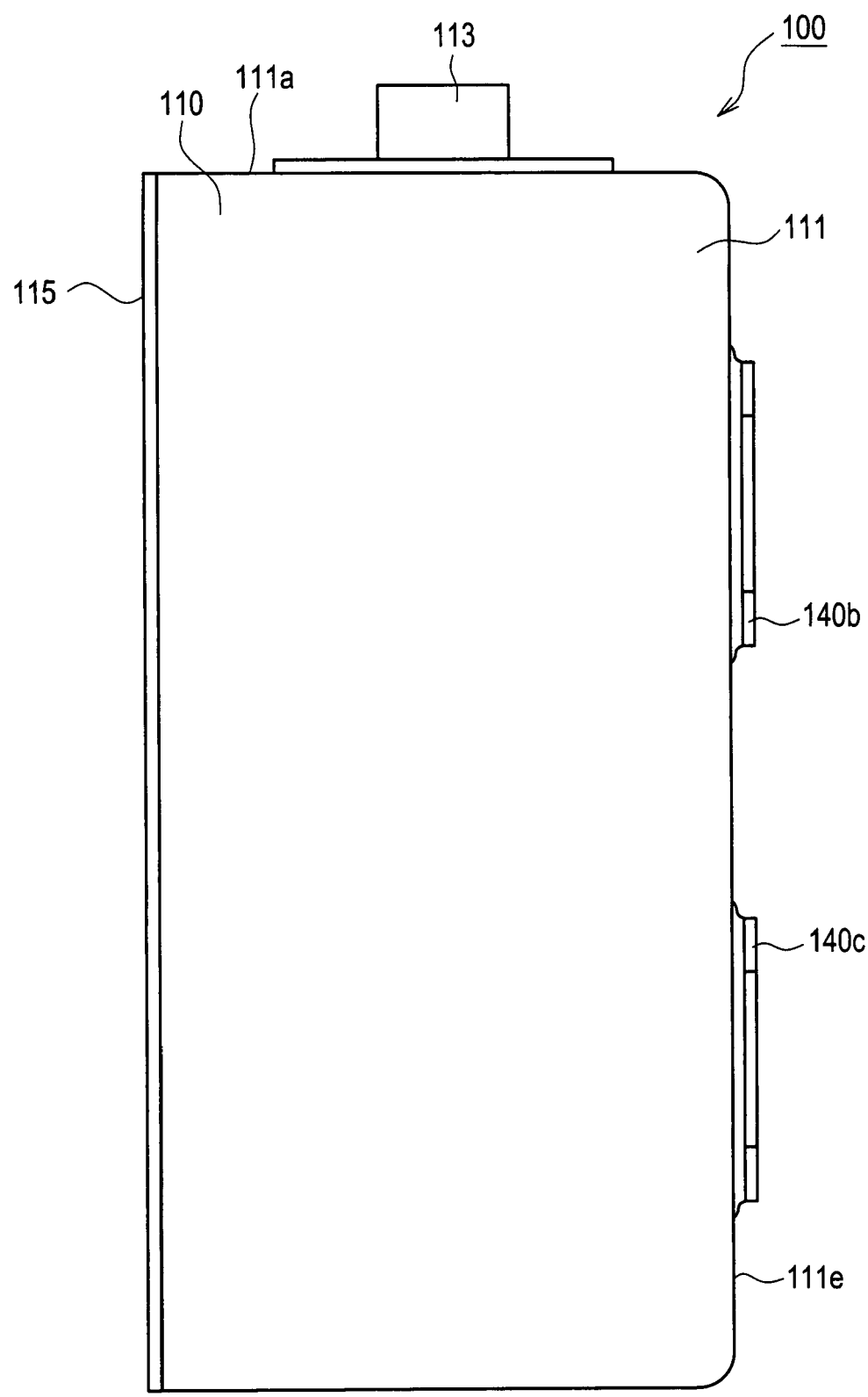
FIG. 1 is a front view of a battery in an embodiment.
Figure 2:
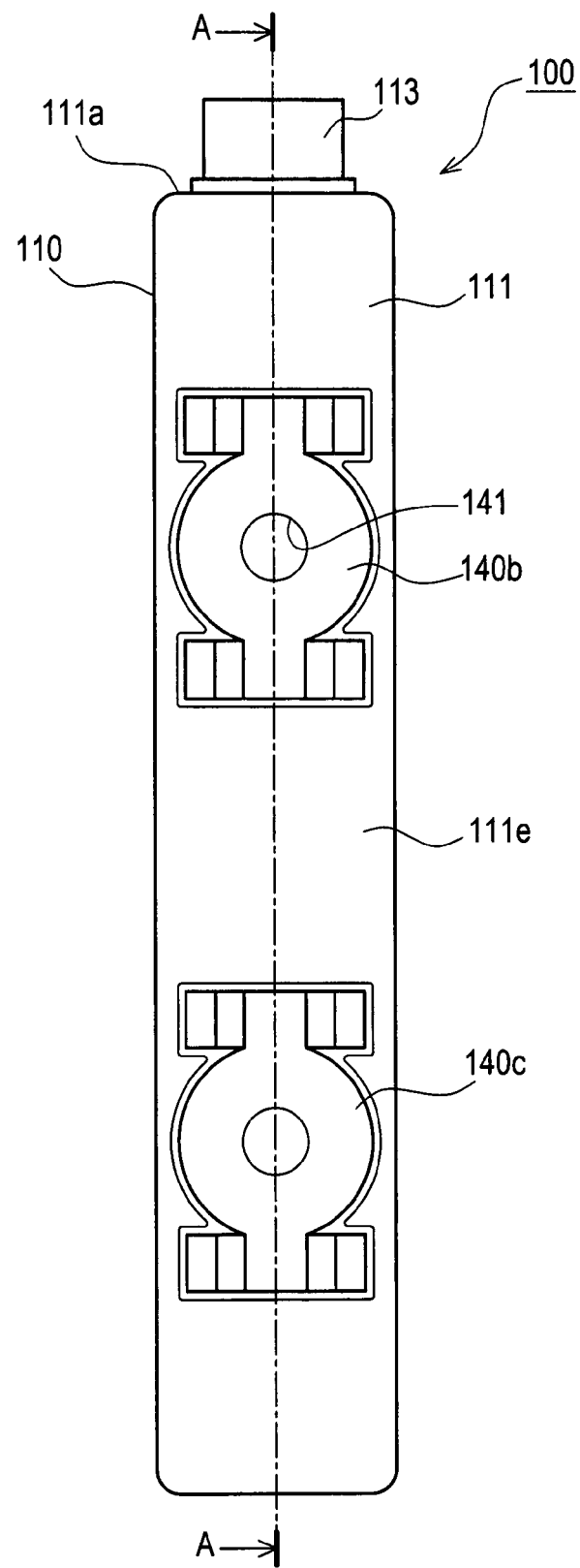
FIG. 2 is a right side view of the battery of FIG. 1.

A detailed description of a preferred embodiment of a battery 100 of the present invention will now be given referring to the accompanying drawings. FIG. 1 is a front view of the battery 100; FIG. 2 is a right side view of the same; and FIG. 3 is a sectional view of the same, taken along a line A-A in FIG. 2.

The battery 100 of the present embodiment is a rectangular sealed nickel-metal hydride storage battery comprising a battery case 110 made of metal (in particular, a nickel-plated steel plate), a safety valve 113, an electrode plate assembly 150 (see FIG. 3) and an electrolyte (not shown) contained in the battery case 110. For the electrolyte, an alkaline aqueous solution primarily consisting of KOH and having a specific gravity of 1.2 to 1.4 may be used.

Figure 3:
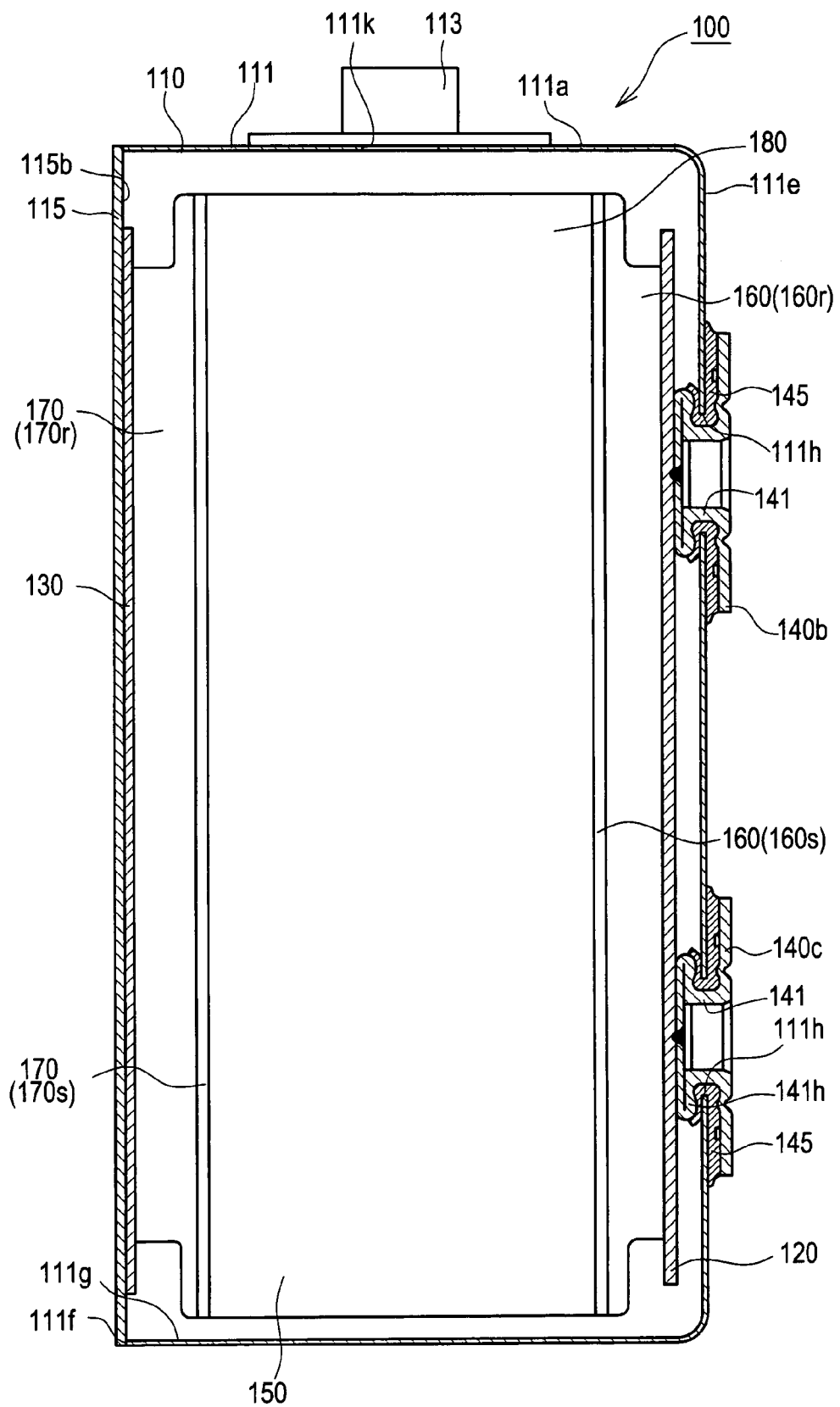
FIG. 3 is a sectional view of the battery of FIG. 1, taken along a line A-A in FIG. 2.

As shown in FIG. 3, the battery case 110 includes a rectangular box-shaped casing 111 made of metal (concretely, a nickel-plated steel plate) and a closing member 115 made of metal (concretely, a nickel-plated steel plate) in rectangular plate form. The casing 111 is formed with two through holes 111$h$ in a side wall 111$e$ (a right wall in FIG. 3). In each of the two through holes 111$h$, a first positive terminal 140$b$ or a second positive terminal 140$c$ is fitted with an electrically-insulating sealing member 145 interposed with respect to the side wall 111$e$. The closing member 115 is in contact with and welded to all around an open end 111$f$ (see FIG. 3) of the casing 111, closing an opening 111$g$ of the casing 111. The battery case 110 is thus structured of the integrally connected closing member 115 and casing 111.

Figure 4:
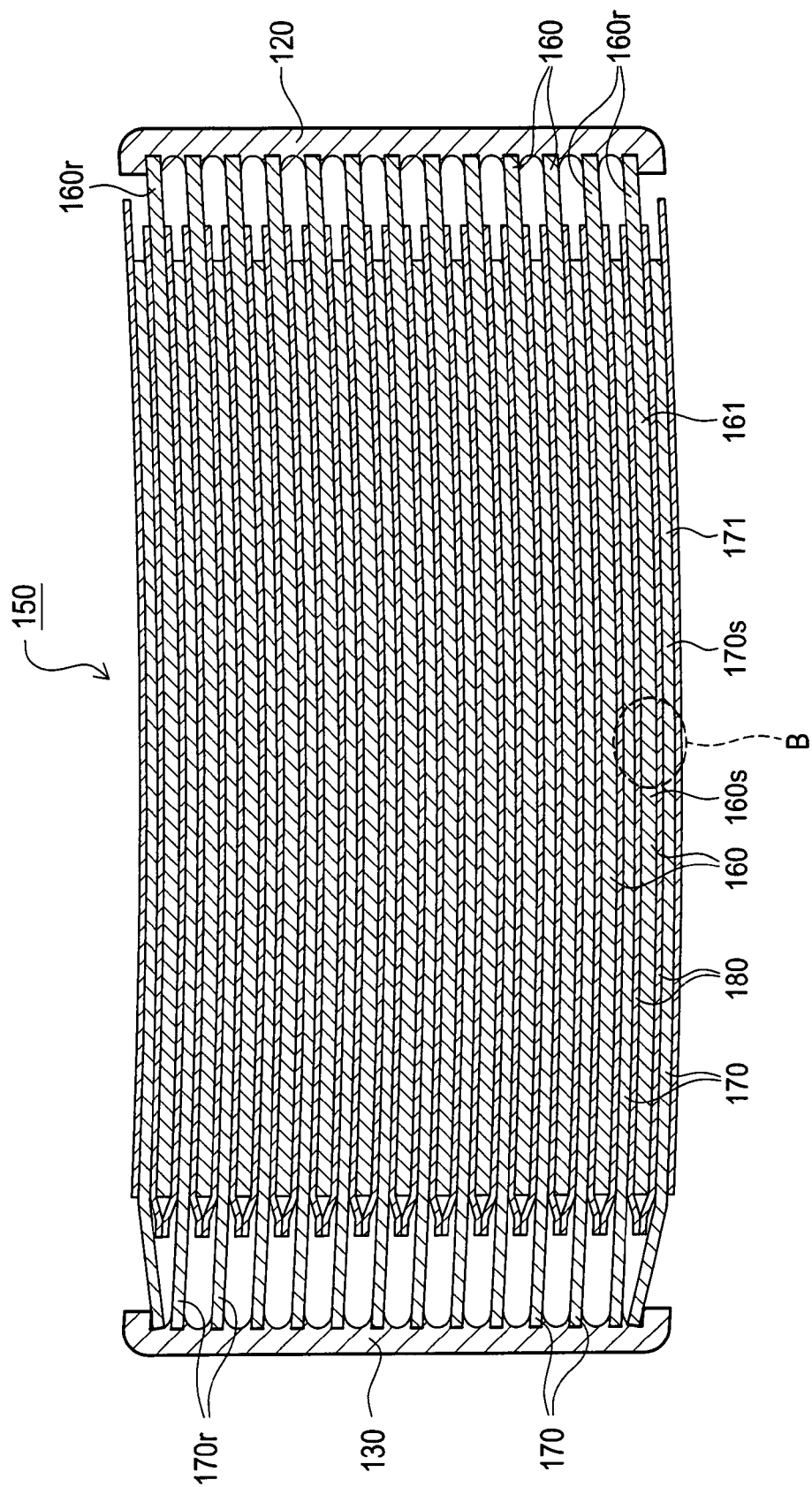
FIG. 4 is a sectional view of an electrode plate assembly of the embodiment.

The electrode plate assembly 150 comprises, as shown in FIG. 4, a plurality of positive electrode plates 160 and a plurality of negative electrode plates 170 which are alternately laminated with separators 180 interposed one by one therebetween.

Figure 5:
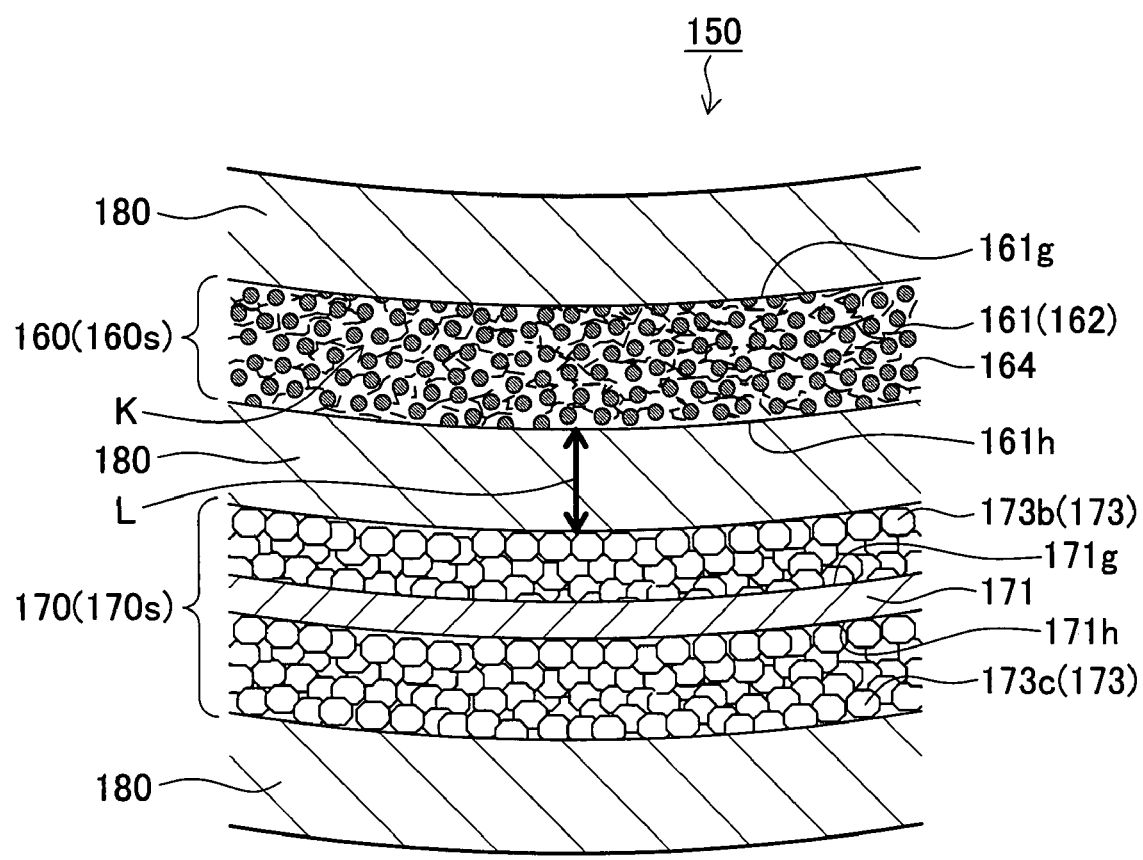
FIG. 5 is an enlarged sectional view of part of the electrode plate assembly, circled with a dotted line B in FIG. 4.

As shown in FIG. 5, each positive electrode plate 160 comprises a positive electrode substrate 161 made of nickel and including a nickel layer 162 (a nickel hollow skeleton) having a three dimensional network structure with a three-dimensional void part K formed of a number of pores joined three-dimensionally, and a mix material for positive electrode (hereinafter, "positive mix material") 164 (a positive active material and others) filled in the void part K of the positive electrode substrate 161. The positive active material used in the present embodiment is an active material containing nickel hydroxide.

Each negative electrode plate 170 comprises a perforated negative electrode substrate 171 made of a nickel-plated steel plate with a number of through holes (not shown) and a front-surface-side negative mix material layer 173$b$ formed on a front surface 171$g$ of the negative electrode substrate 171 and a back-surface-side negative mix material layer 173$c$ formed on a back surface 171$h$, both layers 173$b$ and 173$c$ being made of a mix material for negative electrode (hereinafter, "negative mix material") 173 (containing a hydrogen absorbing alloy), as shown in FIG. 5.

Each separator 180 may be a nonwoven fabric made of synthetic fibers having been subjected to a hydrophilic treatment.

Each of the positive electrode plates 160 includes a positive-electrode filled portion 160$s$ (see FIG. 5) in which the positive electrode substrate 161 is filled with the positive mix material 164 and a positive-electrode connecting end portion 160$r$ in which the positive electrode substrate 161 is filled with no positive mix material, as shown in FIG. 4. Those positive electrode plates 160 are arranged with respective positive electrode connecting end portions 160$r$ protruding in a predetermined direction (rightward in FIG. 4).

The positive electrode connecting end portions 160$r$ are connected to a rectangular positive current collector 120 by electron beam welding or the like as shown in FIG. 4. The positive current collector 120 is further connected to the first and second positive terminals 140$b$ and 140$c$ by laser welding or the like as shown in FIG. 3. In this way, the positive electrode plates 160 are electrically connected to the first and second positive terminals 140$b$ and 140$c$.

Each of the negative electrode plates 170 includes a negative electrode coated portion 170$s$ in which the negative electrode substrate 171 is coated with the negative mix material 173 and a negative electrode connecting end portion 170$r$ in which the negative electrode substrate 171 is coated with no negative mix material. Those negative electrode plates 170 are arranged with respective negative electrode connecting end portions 170$r$ protruding in an opposite direction (leftward in FIG. 4) to the positive electrode connecting end portions 160$r$.

The negative electrode connecting end portions 170$r$ are connected to a rectangular negative current collector 130 by electron beam welding or the like. The negative current collector 130 is further connected to the closing member 115 by electron beam welding or the like as shown in FIG. 3. In the battery 100 of the present embodiment, accordingly, the battery case 110 including the closing member 115 entirely serves as a negative electrode.

Figure 6:
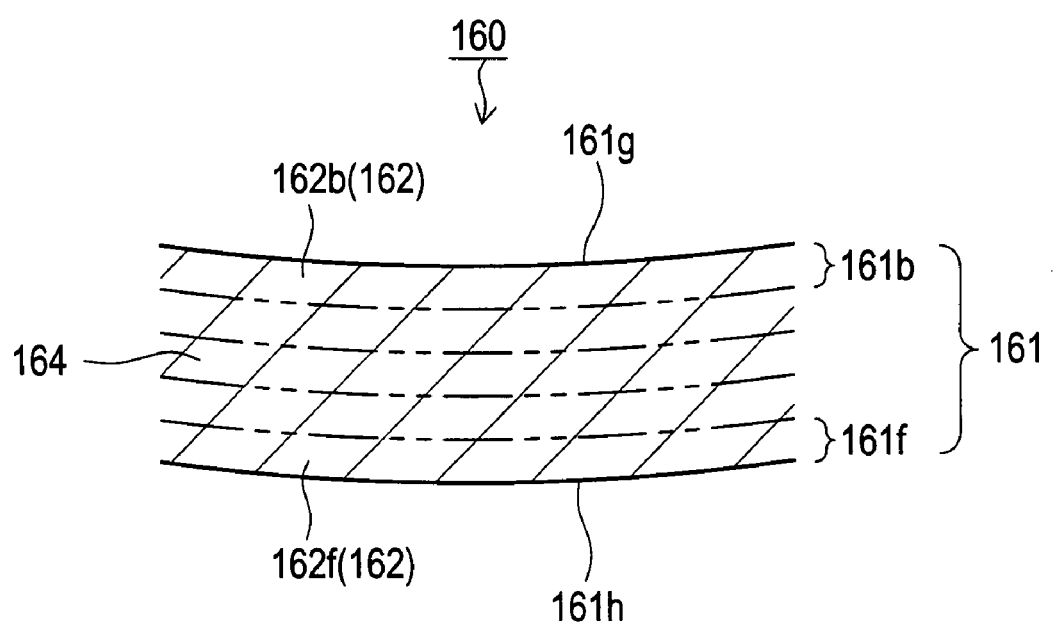
FIG. 6 is an enlarged sectional view of part of a positive electrode plate of the embodiment.

In the present embodiment, meanwhile, each positive electrode plate 160 is of a curved shape as shown in FIG. 6 which is concave on a front surface 161$g$ side of the positive electrode substrate 161 and convex on a back surface 161$h$ side of the positive electrode substrate 161. This configuration is made by a difference in thickness of the nickel layer 162 between portions (regions) of the positive electrode substrate 161 on the front surface 161$g$ side and the back surface 161$h$ side.

To be concrete, as indicated with chain double-dashed lines in FIG. 6, it is assumed that the positive electrode substrate 161 is divided into five regions in its thickness direction (in a vertical direction in FIG. 6), where a region closest to the front surface 161$g$ is a front-surface-side nickel portion 161$b$ and a region closest to the back surface 161$h$ is a back-surface-side nickel portion 161$f$. Here, an average thickness A of the front-surface-side nickel layer 162$b$ forming the nickel skeleton 162 constituting the front-surface-side nickel portion 161$b$ and an average thickness B of a back-surface-side nickel layer 162$f$ forming the nickel skeleton 162 constituting a back-surface-side nickel portion 161$f$ are determined to satisfy a relation of A<B (i.e. $0.75 \leq A/B \leq 0.95$). Accordingly, the positive electrode plate 160 can have a curved shape such that the positive electrode substrate 161 is concave on the front surface 161$g$ side and convex on the back surface 161$h$ side.

It is to be noted that the average thickness A of the front-surface-side nickel layer 162$b$ and the average thickness B of the back-surface-side nickel layer 162f are preferably measured in the following manner.

Figure 7:
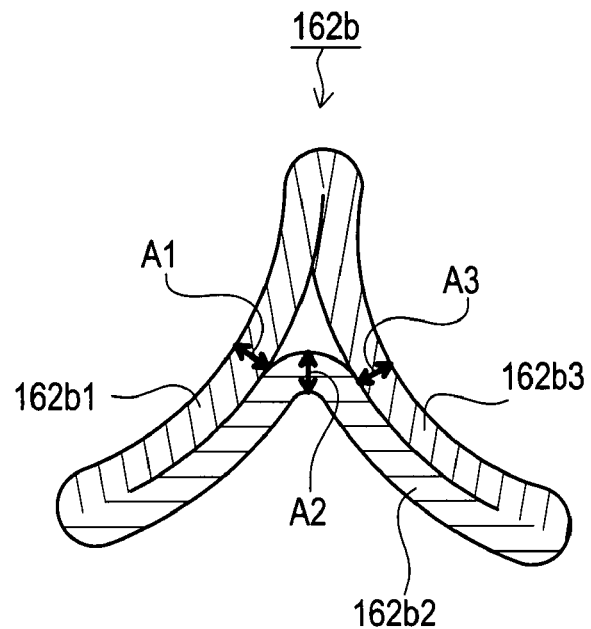
FIG. 7 is an enlarged sectional view of part of a front-surface-side nickel layer of a positive electrode substrate in the positive electrode plate.

The section of the front-surface-side nickel portion 161b is first observed through an SEM (scanning electron microscope) by selecting a sectional image of part of the front-surface-side nickel layer 162b cut in the thickness direction of that nickel layer 162b to include a "triangular section with three sides inwardly curved" as shown in FIG. 7. Respective central thicknesses A1, A2, and A3 of three sides 162b1, 162b2, and 162b3 constructed of the front-surface-side nickel layer 162b are measured and an average value of them is assumed to be the average thickness A of the front-surface-side nickel layer 162b.

Figure 8:
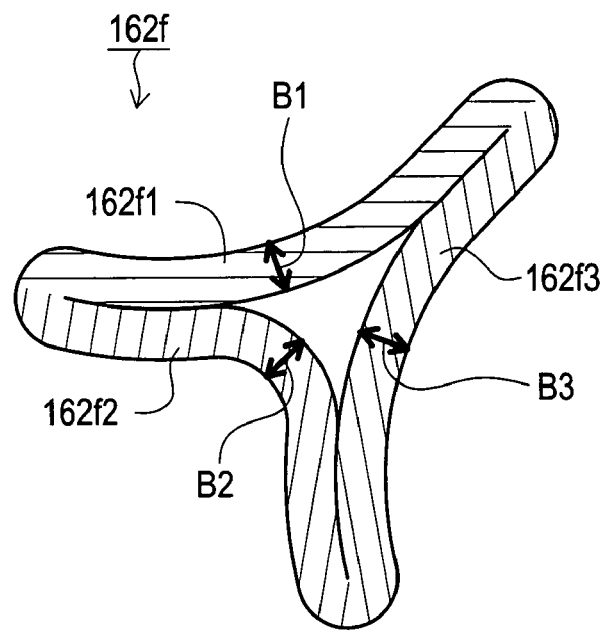
FIG. 8 is an enlarged sectional view of part of a back-surface-side nickel layer of the positive electrode substrate in the positive electrode plate.

Similarly, the section of the back-surface-side nickel portion 161f is observed through the SEM by selecting a sectional image of part of the back-surface-side nickel layer 162f cut in the thickness direction of that nickel layer 162f to include a "triangular section with three sides inwardly curved" as shown in FIG. 8. Respective central thicknesses B1, B2, and B3 of three sides 162f1, 162f2, and 162f3 constructed of the back-surface-side nickel layer 162f are measured and an average value of them is assumed to be the average thickness B of the back-surface-side nickel layer 162f.

Figure 9:
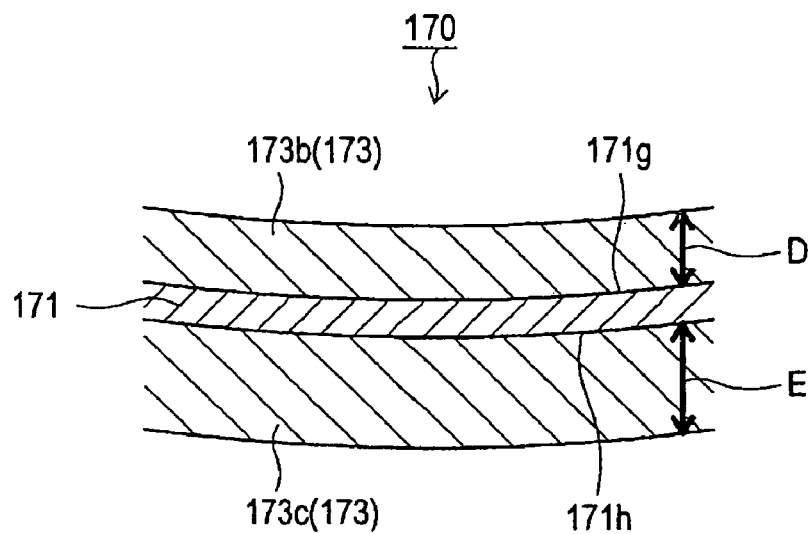
FIG. 9 is an enlarged sectional view of part of a negative electrode plate of the embodiment.

As with the positive electrode plate 160, the negative electrode plate 170 is of a curved shape as shown in FIG. 9 that a front surface 171g of the negative electrode substrate 171 is concavely curved and a back surface 171h of the negative electrode substrate 171 is convexly curved. This configuration is obtained by a difference in thickness between the front-surface-side negative mix material layer 173b formed on the front surface 171g of the negative electrode substrate 171 and the back-surface-side negative mix material layer 173c formed on the back surface 171g. To be concrete, a thickness D of the front-surface-side negative mix material layer 173b and a thickness E of the back-surface-side negative mix material layer 173c are determined to satisfy a relation of D<E (i.e. $0.15 \leq (D+E) \leq 0.45$). Accordingly, the negative electrode plate 170 can have a curved shape which is concave on the front surface 171g side and convex on the back surface 171h side of the negative electrode substrate 171.

In addition, the positive electrode plates 160 and the negative electrode plates 170 are laminated so that each front surface 161g of the positive electrode substrates 161 and each front surface 171g of the negative electrode substrates 171 face to the same side (an upper side in FIG. 5) in the lamination direction (a vertical direction in FIG. 5). Thus, the electrode plate assembly 150 of the present embodiment is structured of the positive electrode plates 160 and the negative electrode plates 170 that are laminated with respective same curves facing to the same side (the upper side in FIG. 5) in the lamination direction.

Even when the positive electrode plates 160 and the negative electrode plates 170 expand after repeated charge and discharge, compressing the separators 180 interposed therebetween, the above configuration can prevent the separators 180 from locally becoming so strongly pressurized as to shorten the distance L between the positive 160 and negative electrode plates 170 (see FIG. 5). Thus, the electrode plate assembly 150 can entirely ensure the insulation property between positive and negative electrode plates. The battery 100 of the present embodiment can therefore be achieved as a battery prevented from causing a short circuit between the positive and negative electrode plates.

A method of manufacturing the battery 100 of the present embodiment will be described below.

Firstly, the method of manufacturing the positive electrode substrate 160 is explained.

[Plating Step]

Figure 10:
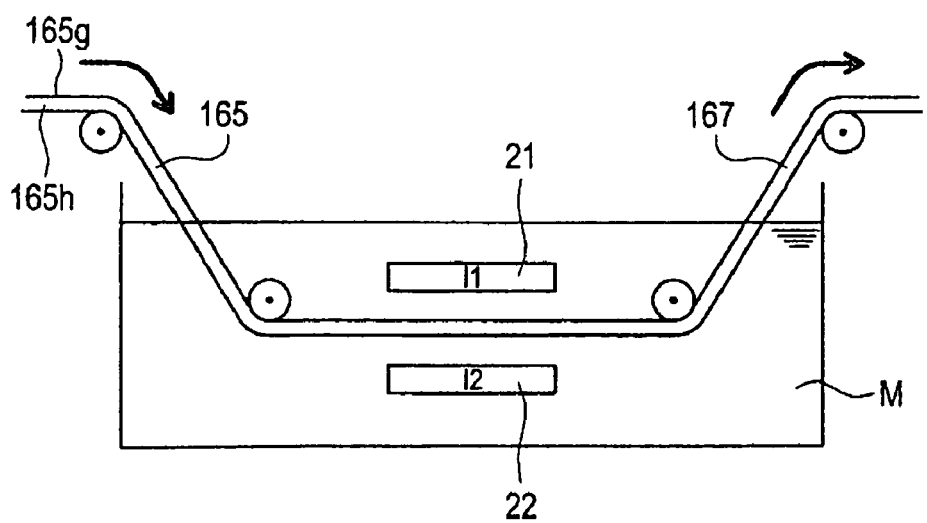
FIG. 10 is an explanatory view for describing a method of manufacturing the positive electrode substrate of the embodiment.

As shown in FIG. 10, a band-shaped foamed urethane substrate 165 having been subjected to a conductivity applying step (e.g. electroless nickel plating and nickel vapor deposition) is fed in a direction indicated by an arrow at a predetermined speed and immersed in a nickel plating solution M for a predetermined time. Consequently, produced is a nickel-coated urethane substrate 167 in which a urethane skeleton surface of the foamed urethane substrate 165 is coated with nickel plating (nickel layer 162).

Figure 11:
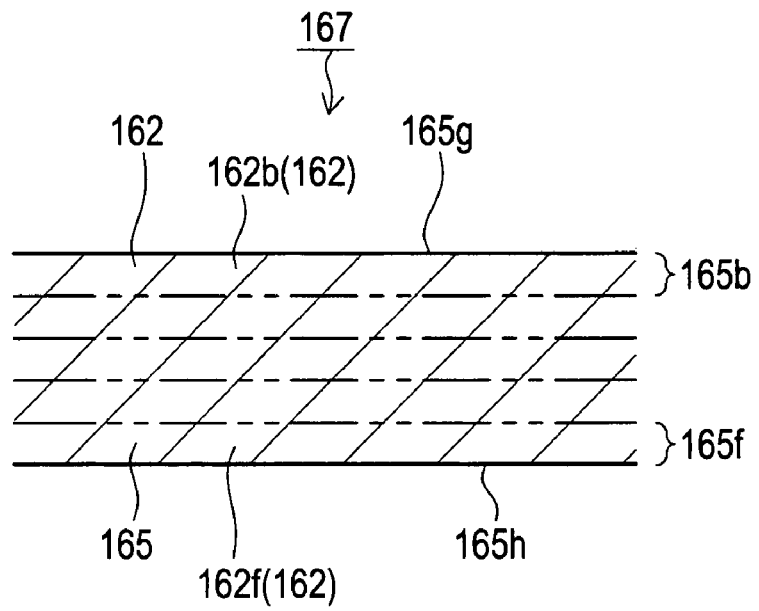
FIG. 11 is an enlarged sectional view of part of a nickel-coated urethane substrate of the embodiment.

In the present embodiment, particularly, a current value I1 of a first electrode 21 placed facing a front surface 165g of the foamed urethane substrate 165 and a current value I2 of a second electrode 22 placed facing a back surface 165h of the foamed urethane substrate 165 are determined to be different from each other. Specifically, the current value I2 of the second electrode 22 is set to be larger than the current value I1 of the first electrode 21. Accordingly, the nickel plating can be applied so that the average thickness A of the front-surface-side nickel layer 162b coated on the surface of the urethane skeleton constituting a front-surface-side urethane portion 165b and the average thickness B of the back-surface-side nickel layer 162f coated on the surface of the urethane skeleton constituting a back-surface-side urethane portion 165f satisfy the relation of A<B (i.e. $0.75 \leq A/B \leq 0.95$) (see FIG. 11). Herein, the front-surface-side urethane portion 165b corresponds to a region closest to the front surface 165g assuming that the foamed urethane substrate 165 is divided into five regions in a direction of thickness. The back-surface-side urethane portion 165f is a region closest to the back surface 165h.

Figure 12:
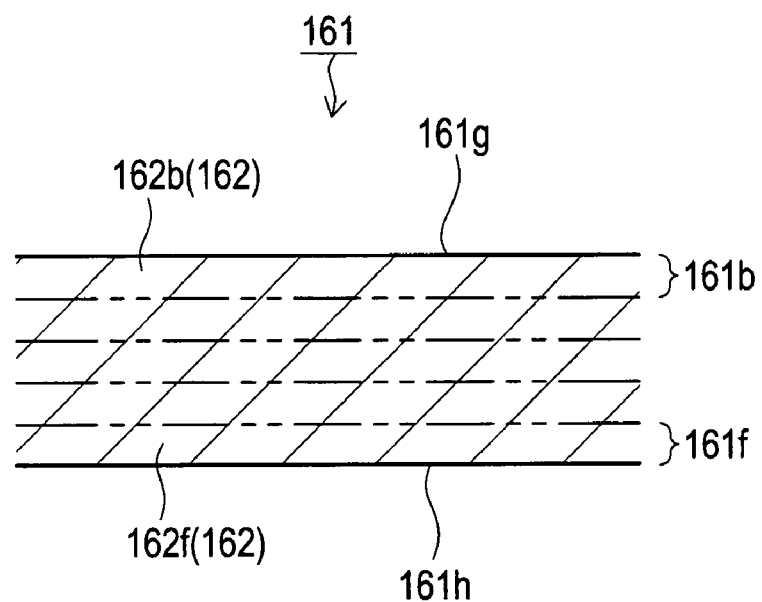
FIG. 12 is an enlarged sectional view of part of the positive electrode substrate of the embodiment.
Figure 13:
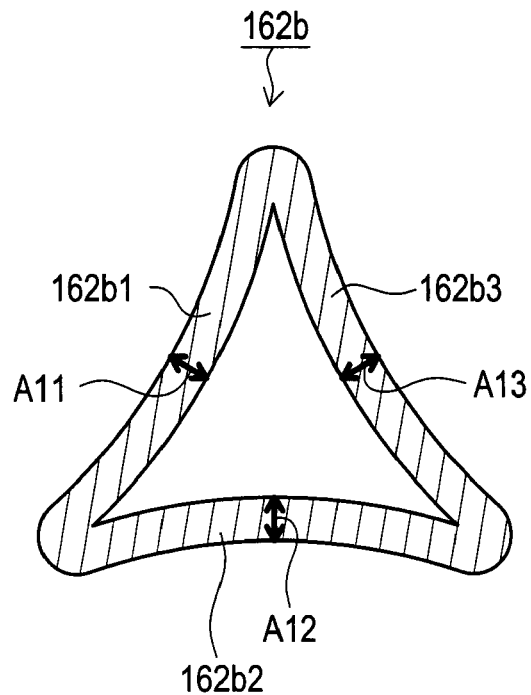
FIG. 13 is an enlarged sectional view of part of the front-surface-side nickel layer of the positive electrode substrate (before compression) of the embodiment.

Thereafter, the urethane forming the nickel-coated urethane substrate 167 is burned off. The positive electrode substrate 161 shown in FIG. 12 is thus produced. As indicated with chain double-dashed lines in FIG. 12, it is assumed that the positive electrode substrate 161 is divided into five regions in its thickness direction (in a vertical direction in FIG. 12), where a region closest to the front surface 161g is the front-surface-side nickel portion 161b and a region closest to the back surface 161h is the back-surface-side nickel portion 161f.

Subsequently, the positive electrode substrate 161 produced as above is subjected to the following measurement to obtain the average thickness A of the front-surface-side nickel layer 162b and the average thickness B of the back-surface-side nickel layer 162f.

Firstly, the void part K (see FIG. 5) of the positive electrode substrate 161 is filled with resin and then cut in the thickness direction. The reason for filling the resin in the void part K is to prevent the nickel layer 162 from becoming compressed and deformed when the positive electrode substrate 161 is cut in the thickness direction.

Secondly, after polishing the cut surface, the section of the front-surface-side nickel portion 161b is observed through the SEM (scanning electron microscope) by selecting a sectional image of the front-surface-side nickel layer 162b cut in the thickness direction thereof, taking a triangular form having three sides. Respective central thicknesses A11, A12, and A13 of the three sides 162b1, 162b2, and 162b3 constructed of the front-surface-side nickel layer 162b is measured. An average value of them is assumed to be the average thickness A of the front-surface-side nickel layer 162b.

Figure 14:
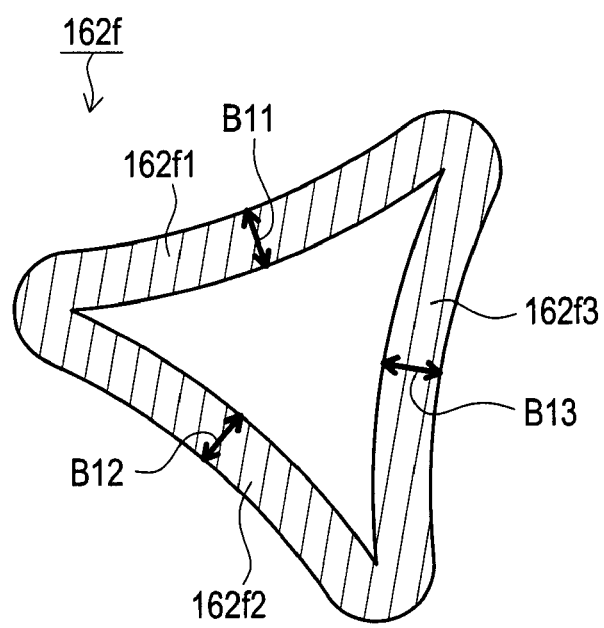
FIG. 14 is an enlarged sectional view of part of the back-surface-side nickel layer of the positive electrode substrate (before compression) of the embodiment.

Similarly, the section of the back-surface-side nickel portion 161f is observed through the SEM by selecting a sectional image of the back-surface-side nickel layer 162f cut in the thickness direction thereof, taking a triangular form as shown in FIG. 14. Respective central thicknesses B11, B12, and B13 of three sides 162*f*1, 162*f*2, and 162*f*3 constructed of the back-surface-side nickel layer 162*f* are measured. An average value of them is assumed to be the average thickness B of the back-surface-side nickel layer 162*f*. As a result of comparison between the average thickness A of the front-surface-side nickel layer 162*b* and the average thickness B of the back-surface-side nickel layer 162*f* obtained as above, it was found that the relation of A<B (i.e. $0.75 \leqq A/B \leqq 0.95$) was satisfied.

Using the aforementioned positive electrode substrate 161, the positive electrode plate 160 is produced in the following manner.

Positive active material (nickel hydroxide) powder and cobalt powder are mixed and knead with water to prepare a paste for positive electrode (hereinafter, a "positive paste"). This positive paste is filled in the void part K of the positive electrode substrate 161, which is then dried and compressed into a predetermined shape (the positive paste when dried and hardened comes to a positive mix material 164). At this time, the back-surface-side nickel layer 162*f* stretches longer along the back surface 161*h* than the front-surface-side nickel layer 162*b*. The positive electrode substrate 161 consequently has a curved shape with the concave front surface 161*g* and the convex back surface 161*h*. This positive electrode substrate 161 is then cut into a predetermined size. Thus, the positive electrode plate 160 as shown in FIG. 6 is produced.

As above, the positive electrode substrate 161 having the desired curved shape with the concave front surface 161*g* and the convex back surface 161*h* can be produced by the method comprising subjecting the foamed urethane substrate 165 to the nickel plating under the condition that the relation between the average thickness A of the front-surface-side nickel layer 162*b* and the average thickness B of the back-surface-side nickel layer 162*f* satisfies the relation of A<B (i.e., $0.75 \leqq A/B \leqq 0.95$).

Next, a method of manufacturing the negative electrode plate 170 is explained.

Firstly, the negative electrode substrate 171 made of a band-shaped nickel-plated steel plate formed with a number of perforated through holes is prepared. Separately from this, hydrogen absorbing alloy $MmNi_{3.55}Co_{0.75}Al_{0.3}$ powder is mixed with water and carboxymethyl cellulose (a binder). The resultant mixture is kneaded into a paste for negative electrode (hereinafter, a "negative paste") 176.

Figure 15:
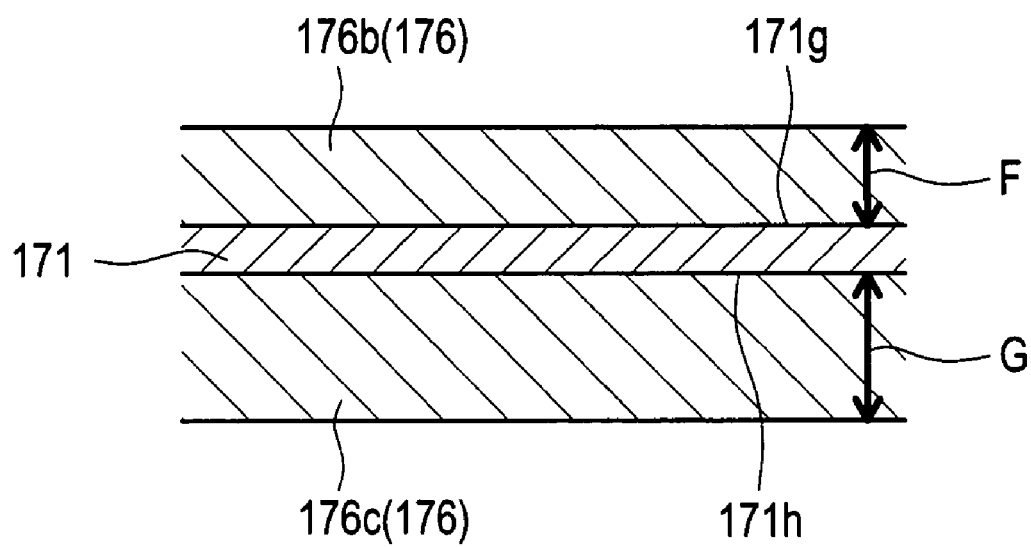
FIG. 15 is an enlarged sectional view of part of the negative electrode substrate coated with negative paste.

As shown in FIG. 15, successively, in a coating step, the negative paste 176 is filled in the through holes of the negative electrode substrate 171 and simultaneously coated on the front surface 171*g* and the back surface 171*h* of the negative electrode substrate 171, forming a front-surface-side negative paste layer 176*b* and a back-surface-side negative paste layer 176*c*. To be more precise, the negative paste 176 is applied to establish a relation of F<G (i.e. $0.15 \leqq F/(F+G) \leqq 0.45$) between a thickness F of the front-surface-side negative paste layer 176*b* and a thickness G of the back-surface-side negative paste layer 176*c*.

Then, in a drying step, the negative paste 176 is dried and hardened, producing the negative electrode substrate 171 provided with the front-surface-side negative mix material layer 173*b* and the back-surface-side negative mix material layer 173*c* (the negative paste 176 when dried and hardened comes to a negative mix material 173). In a subsequent pressing step, this negative electrode substrate 171 is compressed in the thickness direction. At this time, the back-surface-side negative mix material layer 173*c* stretches longer along the back surface 171*h* than the front-surface-side negative mix material layer 173*b*. The negative electrode substrate 171 provided with the front-surface-side negative mix material layer 173*b* and the back-surface-side negative mix material layer 173*c* consequently has a curved shape with the concave front surface 171*g* and the convex back surface 171*h*.

In a cutting step, thereafter, the negative electrode substrate 171 is cut into a predetermined size. The negative electrode plate 170 is thus produced with the relation of D<E ($0.15 \leqq D/(D+E) \leqq 0.45$) between the thickness D of the front-surface-side negative mix material layer 173*b* and the thickness E of the back-surface-side negative mix material layer 173*c*. This results from the coating step in which the negative paste 176 is coated to satisfy the relation of F<G (i.e. $0.15 \leqq F/(F+G) \leqq 0.45$) between the thickness F of the front-surface-side negative paste layer 176*b* and the thickness G of the back-surface-side negative paste layer 176*c*. The thus produced negative electrode plate 170 has a curved shape as shown in FIG. 9 which is concave on the front surface 171*g* side of the negative electrode substrate 171 and convex on the back surface 171*h* side.

[Electrode Plate Assembly Producing Step]

Successively, the positive electrode plates 160 (each satisfying the relation of $0.75 \leqq A/B \leqq 0.95$) and the negative electrode plates 170 (each satisfying the relation of $0.15 \leqq (D+E) \leqq 0.45$) produced as above are alternately laminated with the separators 180 interposed one by one between them, constituting the electrode plate assembly 150. To be concrete, as shown in FIG. 5, the positive electrode plates 160 and the negative electrode plates 170 are alternately laminated with the separators 180 interposed one by one so that the front surfaces 161*g* of the positive electrode substrates 161 and the front surfaces 171*g* of the negative electrode substrates 171 face to the same side (the upper side in FIG. 5) in the lamination direction (the vertical direction in FIG. 5). In this manner, the electrode plate assembly 150 shown in FIG. 5 is produced.

As shown in FIG. 4, the positive current collector 120 is connected by electron beam welding to the positive electrode connecting end portions 160*r* of the positive electrode plates 160 of the electrode plate assembly 150. Further, the negative current collector 130 is connected by electron beam welding to the negative electrode connecting end portions 170*r* of the negative electrode plates 170.

Separately from this, as shown in FIG. 3, the first and second positive terminals 140*b* and 140*c* are fixed to the casing 111. Specifically, the sealing members 145 are fitted in the through holes 111*h* of the casing 111 and then the cylindrical parts 141 of the first and second positive terminals 140*b* and 140*c* are respectively inserted therein from outside. Under fluid pressure to the recess of each cylindrical part 141, a closed end of the cylindrical part 141 is axially compressed to radially outwardly expand, forming the compressively-deformed portion 141*h*. Accordingly, the first and second positive terminals 140*b* and 140*c* are fixed to the casing 111 but electrically insulated therefrom.

Thereafter, the negative current collector 130 connected to the negative electrode plates 170 of the electrode plate assembly 150 is connected to an inner surface 115*b* of the closing member 115 by electron beam welding. This connected assembly is inserted, from the positive current collector 120 side, into the casing 111 through the opening 111*g*. At this time, the closing member 115 can close the casing 111. By laser irradiation from outside, the closing member 115 and the casing 111 are connected to each other, thus closing the casing 111. The first and second positive terminals 140*b* and 140*c* are then subjected to laser irradiation from outside to respective recesses of the cylindrical parts 141. The compressively-deformed portion 141h of each cylindrical part 141 is connected to the positive current collector 120. An electrolyte is poured in the casing 111 through a port 111k formed on a top wall 111a and then the safety valve 113 is attached to close the port 111k. After subjected to a predetermined step such as initial charge, the battery 100 is completed.

[Short-Circuit Test]

A short-circuit test was carried out with respect to the electrode bodies 150 according to the present embodiment (Examples 1 to 4) and those according to comparative configurations (Comparative examples 1 to 3).

To be concrete, seven types of electrode bodies (Examples 1 to 4 and Comparative examples 1 to 3) having different combinations of a A/B value of the positive electrode plate and a D/(D+E) value of the negative electrode plate were prepared. Using those electrode bodies, samples were produced by welding each positive current collector 120 and each negative current collector 130 to each electrode plate assembly. These were used as Samples 1 to 7.

EXAMPLE 1

In the electrode plate assembly producing step, the electrode plate assembly 150 was produced using the positive electrode plate of A/B=0.9 and the negative electrode plate of D/(D+E)=0.4. This electrode plate assembly 150 was welded to the positive current collector 120 and the negative current collector 130. In this way, one hundred samples 1 were produced as Example 1.

EXAMPLE 2

In the electrode plate assembly producing step, the electrode plate assembly 150 was produced using the positive electrode plate of A/B=0.85 and the negative electrode plate of D/(D+E)=0.4. This electrode plate assembly 150 was welded to the positive current collector 120 and the negative current collector 130. In this way, one hundred samples 2 were produced as Example 2.

EXAMPLE 3

In the electrode plate assembly producing step, the electrode plate assembly 150 was produced using the positive electrode plate of A/B=0.95 and the negative electrode plate of D/(D+E)=0.4. This electrode plate assembly 150 was welded to the positive current collector 120 and the negative current collector 130. In this way, one hundred samples 3 were produced as Example 3.

EXAMPLE 4

In the electrode plate assembly producing step, the electrode plate assembly 150 was produced using the positive electrode plate of A/B=0.9 and the negative electrode plate of D/(D+E)=0.45. This electrode plate assembly 150 was welded to the positive current collector 120 and the negative current collector 130. In this way, one hundred samples 4 were produced as Example 4.

COMPARATIVE EXAMPLE 1

Using the positive electrode plate of A/B=1.0 and the negative electrode plate of D/(D+E)=0.4, the electrode plate assembly was produced. This electrode plate assembly was welded with the positive current collector 120 and the negative current collector 130. In this way, one hundred samples 5 were produced as Comparative example 1.

COMPARATIVE EXAMPLE 2

Using the positive electrode plate of A/B=0.9 and the negative electrode plate of D/(D+E)=0.5, the electrode plate assembly was produced. This electrode plate assembly was welded to the positive current collector 120 and the negative current collector 130. In this way, one hundred samples 6 were produced as Comparative example 2.

COMPARATIVE EXAMPLE 3

Using the positive electrode plate of A/B=0.9 and the negative electrode plate of D/(D+E)=0.55, the electrode plate assembly was produced. This electrode plate assembly was welded to the positive current collector 120 and the negative current collector 130. In this way, one hundred samples 7 were produced as Comparative example 3.

Figure 16:
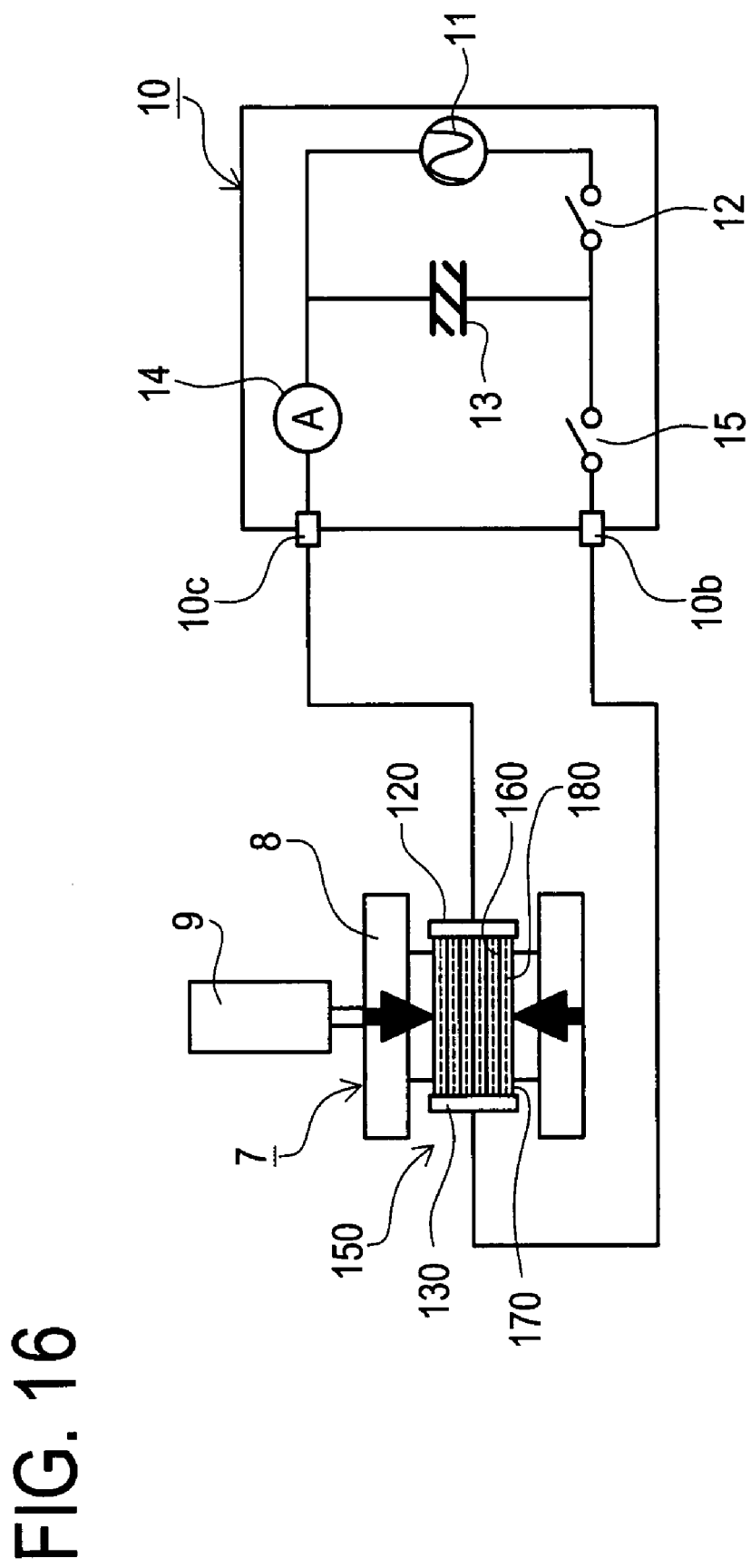
FIG. 16 is an explanatory view for describing a short-circuit test of the embodiment.

The above samples 1 to 7, each of which was prepared by one hundred pieces, were subjected to a short-circuit test using a well known pressure device 7 and a short-circuit detector 10 shown in FIG. 16 (see JP-A-2001-236985). The pressure device 7 comprises a pressure jig 8 and a cylinder unit 9 arranged to pressurize and compress each sample in the lamination direction (a vertical direction in FIG. 16) of the electrode plate assembly (electrode plate assembly 150). The short-circuit detector 10 is constructed such that a condenser 13 is connected to a power source 11 via a first switch 12, a second switch 15 is placed between the condenser 13 and a first output terminal 10b, and a current detector 14 is located between the condenser 13 and a second output terminal 10c.

A concrete test was conducted in the following way. Each sample was set in the pressure device 7, and the positive current collector 120 was connected to the second output terminal 10c and the negative current collector 130 was connected to the first output terminal 10b. The first and second switches 12 and 15 remained open. In this state, the pressure jig 8 was moved down by the cylinder unit 9, compressing the electrode plate assembly (150) under a predetermined load (e.g. about 50 N/cm$^2$=about 5 kgf/cm$^2$) in the lamination direction (the vertical direction in FIG. 16). While the electrode plate assembly was in a compressed state, the first switch 12 was closed to charge the condenser 13 from the power source 11.

After completion of charge to the condenser 13, the first switch 12 was opened and the second switch 15 was closed, thereby passing a current to each sample at an applied voltage of about 400 V. The current was measured by the current detector 14. If the current was detected by the current detector 14, representing that a short circuit could have occurred between the positive and negative electrode plates, it was judged as a defect. Then, the defective fraction of each sample 1 to 7 (Examples 1 to 4 and Comparative examples 1 to 3) was calculated. This result is shown in Table 1.

TABLE 1

| | A/B | D/(D + E) | Defective fraction |
|---|---|---|---|
| Example. 1 (Sample 1) | 0.9 | 0.4 | 0% |
| Example. 2 (Sample 2) | 0.85 | 0.4 | 0% |
| Example. 3 (Sample 3) | 0.95 | 0.4 | 1% |
| Example. 4 (Sample 4) | 0.9 | 0.45 | 2% |
| Comparative example 1 (Sample 5) | 1.0 | 0.4 | 10% |

TABLE 1-continued

|  | A/B | D/(D + E) | Defective fraction |
|---|---|---|---|
| Comparative example 2 (Sample 6) | 0.9 | 0.5 | 8% |
| Comparative example 3 (Sample 7) | 0.9 | 0.55 | 15% |

Comparison is made first between the results in Examples 1 to 3 (Samples 1 to 3) and Comparative example 1 (Sample 5). These samples are different in the A/B value but equal in the D/(D+E) value=0.4.

As shown in Table 1, in Examples 1 and 2 (Samples 1 and 2) where A/B=0.9, 0.85, respectively, the defective fraction was 0%. In other words, there was no sample in which a short circuit could have occurred between the positive and negative electrodes, among one hundred samples in Examples 1 and 2 (Samples 1 and 2). In Example 3 (Sample 3) where A/B=0.95, the defective fraction was 1% and there are only few samples in which a short circuit could have occurred between the positive and negative electrodes (to be concrete, only one of a hundred samples was defective).

In Comparative example (Sample 5) where A/B=1.0, the defective fraction is 10% and there were many samples in which a short circuit could have occurred between the positive and negative electrodes as compared with Examples 1 to 3 (Samples 1 to 3).

From the above results, configuring the electrode plate assembly to establish the relation of A<B, preferably, A/B≦0.95, makes it possible to prevent a short circuit from occurring between the positive and negative electrodes.

The following comparison is made between the results in Examples 1 and 4 (Samples 1 and 4) and Comparative examples 2 and 3 (Samples 6 and 7). These samples are equal in the A/B value=0.9 but different in the D/(D+E) value.

As shown in Table 1, in Example 1 (Sample 1) where D/(D+E)=0.4, the defective fraction was 0%. In other words, there was no sample in which a short circuit could have occurred between the positive and negative electrodes. Further, in Example 4 (Sample 4) where D/(D+E)=0.45, the defective fraction was 2% and there were only few samples in which a short circuit could have occurred between the positive and negative electrodes (to be concrete, only two of a hundred samples were defective).

In Comparative examples 2 and 3 (Samples 6 and 7) where D/(D+E)=0.5, 0.55, respectively, the defective fraction was 8% and 15% and there were many samples in which a short circuit could have occurred between the positive and negative electrodes as compared with Examples 1 and 4 (Samples 1 and 4).

From the above results, configuring the electrode plate assembly to establish the relation of D<E, preferably, D/(D+E)≦0.45, makes it possible to prevent a short circuit from occurring between the positive and negative electrodes.

If the A/B value of the positive electrode plate is too small, that is, the difference between the average thickness A of the front-surface-side nickel layer and the average thickness B of the back-surface-side nickel layer is too large, the battery life is likely to decrease. This is because nonuniform thickness of the nickel layer by region in the positive electrode plate will cause a current to be unevenly distributed in the positive electrode plate, and the positive active material surrounded by the back-surface-side nickel layer through which large amounts of current will pass is considerably consumed. The battery life therefore may early come to the end. If the D/(D+E) value of the negative electrode plate is too small, that is, the difference between the thickness D of the front-surface-side negative mix material layer and the thickness E of the back-surface-side negative mix material layer is too large, the hydrogen absorbing alloy contained in the front-surface-side negative mix material layer is considerably consumed, inducing shortening of the battery life.

In Examples 1 to 4 (Samples 1 to 4), on the other hand, in the electrode plate assembly producing step, the positive electrode plate satisfying the relation of A/B≧0.75 was used and the negative electrode plate satisfying the relation of D/(D+E)≧0.15 was used to form the electrode plate assembly 150. In the positive electrode plate (i.e. the positive electrode substrate), specifically, the average thickness A of the front-surface-side nickel layer and the average thickness B of the back-surface-side nickel layer were determined to satisfy the relation of A/B≧0.75, thereby avoiding an excessive difference between the average thickness A and the average thickness B. Similarly, in the negative electrode plate, the thickness D of the front-surface-side negative mix material layer and the thickness E of the back-surface-side negative mix material layer were determined to satisfy the relation of D/(D+E)≧0.15 to avoid an excessive difference between the thickness D and the thickness E. This makes it possible to prevent a short circuit from occurring between the positive and negative electrode plates and the battery life from shortening.

The present invention is described referring to the above embodiment (Examples 1 to 4) but may be embodied in other specific forms without departing from the essential characteristics thereof.

For instance, in the above embodiment (Examples 1 to 4), the nickel hydride storage battery is manufactured as the battery 100. The present invention however may be applied to any batteries that include an electrode plate assembly with a plurality of positive electrode plates and a plurality of negative electrode plates which are alternately laminated with separators interposed one by one between them.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A battery comprising an electrode plate assembly having:
   a plurality of positive electrode plates each of which includes:
      a positive electrode substrate made of nickel and including a nickel skeleton of a three-dimensional network structure having a void part formed of a number of pores three-dimensionally connected, the positive electrode substrate having a front surface and a back surface, and
      a positive mix material filled in the void part of the positive electrode substrate;
   a plurality of negative electrode plates each of which includes:
      a negative electrode substrate made of metal having a front surface and a back surface,
      a front-surface-side negative mix material layer provided on the negative-electrode-substrate front surface and a back-surface-side negative mix material; and
   a plurality of separators;

the positive electrode plates and the negative electrode plates being alternately laminated with the separators interposed one by one between them, wherein each the positive electrode substrate is configured to satisfy a relation of A<B, where "A" is an average thickness of a front-surface-side nickel layer forming the nickel skeleton constituting a front-surface-side nickel portion and "B" is an average thickness of a back-surface-side nickel layer forming the nickel skeleton constituting a back-surface-side nickel portion, assuming that the positive electrode substrate is divided into five regions in a thickness direction, a region closest to the positive-electrode-substrate front surface is the front-surface-side nickel portion and a region closest to the positive-electrode-substrate back surface is the back-surface-side nickel portion, and each of the negative electrode plates is configured to satisfy a relation of D<E, where "D" is a thickness of the front-surface-side negative mix material layer and "E" is a thickness of the back-surface-side negative mix material layer, and the positive electrode plates and the negative electrode plates are laminated so that all the positive-electrode-substrate front surfaces and the negative-electrode-substrate front surfaces face to the same side in the lamination direction.

2. The battery according to claim 1, wherein the positive electrode plate is configured to satisfy a relation of A/B≦0.95 between the average thickness A of the front-surface-side nickel layer and the average thickness B of the back-surface-side nickel layer, and the negative electrode plate is configured to satisfy a relation of D/(D+E)≦0.45 between the thickness D of the front-surface-side negative mix material layer and the thickness E of the back-surface-side negative mix material layer.

3. The battery according to claim 2, wherein the positive electrode plate is configured to satisfy a relation of A/B≧0.75 between the average thickness A of the front-surface-side nickel layer and the average thickness B of the back-surface-side nickel layer, and the negative electrode plate is configured to satisfy a relation of D/(D+E)≧0.15 between the thickness D of the front-surface-side negative mix material layer and the thickness E of the back-surface-side negative mix material layer.

4. A method of manufacturing a battery comprising an electrode plate assembly having:

a plurality of positive electrode plates each of which includes:

a positive electrode substrate made of nickel and including a nickel skeleton of a three-dimensional network structure having a void part formed of a number of pores three-dimensionally connected, the positive electrode substrate having a front surface and a back surface, and a positive mix material filled in the void part of the positive electrode substrate;

a plurality of negative electrode plates each of which includes:

a negative electrode substrate made of metal having a front surface and a back surface, a front-surface-side negative mix material layer provided on the negative-electrode-substrate front surface and a back-surface-side negative mix material layer provided on the negative-electrode-substrate back surface, both layers being made of a negative mix material; and a plurality of separators;

the positive electrode plates and the negative electrode plates being alternately laminated with the separators interposed one by one between then, wherein the method comprises a step of producing the electrode plate assembly comprising alternately laminating the positive electrode plates each configured to satisfy a relation of A<B, where "A" is an average thickness of a front-surface-side nickel layer forming the nickel skeleton constituting a front-surface-side nickel portion and "B" is an average thickness of a back-surface-side nickel layer forming the nickel skeleton constituting a back-surface-side nickel portion, assuming that the positive electrode substrate is divided into five regions in a thickness direction, a region closest to the positive-electrode-substrate front surface is the front-surface-side nickel portion and a region closest to the positive-electrode-substrate back surface is the back-surface-side nickel portion, and the negative electrode plates each configured to satisfy a relation of D<E, where "D" is a thickness of the back-surface-side negative mix material layer, while interposing the separators one by one between the positive and negative electrode plates, so that all the positive-electrode-substrate front surfaces and the negative-electrode-substrate front surfaces face to the same side in the lamination direction.

5. The method of manufacturing the battery according to claim 4, wherein the electrode plate assembly producing the step uses the positive electrode plates each configured to satisfy a relation of A/B≦0.95 between the average thickness A of the front-surface-side nickel layer and the average thickness B of the back-surface-side nickel layer, and the negative electrode plates each configured to satisfy a relation of D/(D+E)≦0.45 between the thickness D of the front-surface-side negative mix material layer and the thickness D of the front-surface-side negative mix material layer and the thickness E of the back-surface-side negative mix material layer.

6. The method of manufacturing the battery according to claim 5, wherein the electrode plate assembly producing step uses the positive electrode plates each configured to satisfy a relation of A/B≧0.75 between the average thickness A of the front-surface-side nickel layer and the average thickness B of the back-surface-side nickel layer, and the negative electrode plates each configures to satisfy a relation of D/(D+E)≧0.15 between the thickness D of the front-surface-side negative mix material layer and the thickness E of the back-surface-side negative mix material layer.

* * * * *